US012625586B2

(12) United States Patent
Takkar et al.

(10) Patent No.: US 12,625,586 B2
(45) Date of Patent: May 12, 2026

(54) METHODS FOR CLASSIFYING TOUCH INPUTS ON A CAPACITIVE INTERFACE

(71) Applicant: Huawei Technologies Co., Ltd., Shenzhen (CN)

(72) Inventors: Manpreet Singh Takkar, Brampton (CA); Wei Zhou, Richmond Hill (CA); Shung Hei Lynn, Thornhill (CA); Shuping Lu, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/742,918

(22) Filed: Jun. 13, 2024

(65) Prior Publication Data

US 2025/0383741 A1     Dec. 18, 2025

(51) Int. Cl.
*G06F 3/044*          (2006.01)

(52) U.S. Cl.
CPC .... *G06F 3/044* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 11,036,327 B2 | 6/2021 | Zhao et al. | |
| 2015/0242009 A1 | 8/2015 | Xiao et al. | |
| 2021/0072857 A1* | 3/2021 | Zhao | G06F 3/0414 |
| 2022/0276737 A1* | 9/2022 | Cunha | G06F 30/27 |

OTHER PUBLICATIONS

Quinn, P. et al., "Deep Touch: Sensing Press Gestures from Touch Image Sequences," Artificial Intelligence for Human Computer Interaction: A Modern Approach. Human-Computer Interaction Series. Springer, Nov. 2021, 24 pages.

* cited by examiner

*Primary Examiner* — Stephen T. Reed
(74) *Attorney, Agent, or Firm* — Slater Matsil, LLP

(57)          ABSTRACT

Embodiments of the present application provide methods for classifying a detected touch input on a capacitive interface. A sequence of capacitive images representing capacitive sensor data associated with touch inputs detected during a continuous touch gesture is obtained. The capacitive images are sequentially processed using a machine learning model. A touch region of the capacitive image that corresponds to an area of the capacitive interface associated with a current touch input for the capacitive image is identified. A set of features of the identified touch region is extracted using the machine learning model. A state of touch of the capacitive image is determined based on the extracted set of features and one or more previous capacitive images associated with previously detected touch inputs during the continuous touch gesture.

21 Claims, 8 Drawing Sheets

METHODS FOR CLASSIFYING TOUCH INPUTS ON A CAPACITIVE INTERFACE

TECHNICAL FIELD

The present application relates to human interface devices and, in particular, to methods for classifying touch inputs on a capacitive interface.

BACKGROUND

Touchscreens are ubiquitous in modern electronic devices. The most common touchscreen technology used today is capacitive sensing. The input panel of a capacitive touchscreen consists of an insulator that is coated with a transparent conductor, such as indium tin oxide. When an input device (e.g., a user's finger, conductive stylus, etc.) touches or is brought near the surface of a capacitive touchscreen, the local electrostatic field is distorted. The resultant change in capacitance can be measured and used to detect the touch input and determine its location on the touchscreen. The touch location data may then be sent to a controller (e.g., a CMOS digital signal processor) for processing.

Touch sensing technology that retains the richness of touch behavior information for a capacitive interface may enable greater scope of user interaction. In general, it is desired to increase the dimensionality of touch interaction data beyond traditional touch input parameters, such as two-dimensional touch location, direction of touch gesture, duration of touch, and the like.

SUMMARY

In an aspect, the present application describes a computer-implemented method for classifying a detected touch input on a capacitive interface. The method may include: obtaining a sequence of capacitive images representing capacitive sensor data associated a continuous touch gesture; and sequentially processing the capacitive images using a machine learning model, wherein for each capacitive image, processing the capacitive image using the machine learning model may include: identifying a touch region of the capacitive image that corresponds to an area of the capacitive interface associated with a current touch input for the capacitive image; extracting a first set of features of the identified touch region using the machine learning model; and determining a state of touch of the capacitive image based on the extracted first set of features and one or more previous capacitive images associated with the continuous touch gesture.

The methods described herein may enable classifying the state of touch continuously during a touch instance. In particular, the state of touch may be continuously predicted even when it alternates between multiple different states (e.g., normal touch, heavy press). The state of touch may be predicted based on capacitive image data that is readily available on electronic devices having a capacitive sensor, without resorting to using complex hardware for measuring various touch input parameter values (e.g., pressure, force, etc.).

The disclosed methods may also facilitate compensating for missing information when a part of a finger used for a touch input lands outside of a touchscreen. Specifically, partial finger readings may be artificially completed, to make it consistent with complete finger touches that are detected for the touchscreen. For example, readings for a finger touch input detected near an edge of the touchscreen (such that the finger partially lands outside of the touchscreen) may be "completed" based on measured intensity values associated with a known complete finger touch. The artificially completed finger readings may then be used in the (continuous) estimation of state of touch of the touch input.

In some implementations, the machine learning model may include a convolutional neural network layer and a recurrent neural network layer.

In some implementations, the first set of features may be extracted using the convolutional neural network layer and determining the state of touch of the capacitive image may include providing the extracted first set of features and the one or more previous capacitive images as input to the recurrent neural network layer.

In some implementations, identifying the touch region may include determining, based on the capacitive sensor data, a region of the capacitive image that is associated with signal strength indicating the detected touch input.

In some implementations, the method may further include determining a sub-image of the capacitive image that contains the touch region, and extracting the first set of features may include providing the sub-image as input to the machine learning model.

In some implementations, the method may further include: processing the sub-image using a high-pass filter to obtain a filtered sub-image; and determining a normalized sub-image based on the filtered sub-image, wherein the normalized sub-image may be provided as input to the machine learning model.

In some implementations, the state of touch may indicate an intended amount of applied force associated with the current touch input.

In some implementations, the state of touch may comprise one of: a heavy press; or a normal touch.

In some implementations, the continuous touch gesture may comprise a force-based press gesture on the capacitive interface.

In some implementations, the machine learning model may use one or more defined thresholds in determining the state of touch of the capacitive image.

In some implementations, the method may further include: obtaining sample touch data including one or more of: first touch data associated with at least one first touch input of a first type; second touch data associated with at least one second touch input of a second type; third touch data associated with at least one third touch input that transitions from a touch input of the first type to a touch input of the second type; or fourth touch data associated with at least one fourth touch input that transitions from a touch input of the second type to a touch input of the first type, and the one or more defined thresholds may be determined based on the obtained sample touch data.

In some implementations, the method may further include: determining a distribution of outputs of a neural network of the machine learning model based on touch input data collected from multiple users; and determining a plurality of sensitivity levels based on the distribution, each sensitivity level being associated with a respective threshold value of output of the neural network, and the one or more defined thresholds may correspond to user selections of sensitivity levels.

In another aspect, the present application describes a computer-implemented method for classifying a detected touch input on a capacitive interface. The method may include: obtaining a first capacitive image representing capacitive sensor data associated with a first touch input detected during a continuous touch gesture; identifying a touch region of the first capacitive image that corresponds to an area of the capacitive interface associated with the first touch input; determining a first sum of measured capacitance values within the identified touch region; and determining a state of touch of the first capacitive image based on comparing the first sum against a defined threshold value.

In some implementations, determining the state of touch of the first capacitive image may include: in response to determining that the first sum is greater than the defined threshold value, determining that the first touch input is associated with a first type; or in response to determining that the first sum is less than or equal to the defined threshold value, determining that the first touch input is associated with a second type.

In some implementations, the method may further include: for each of one or more previous capacitive images associated with touch inputs that are detected prior to the first touch input during the continuous touch gesture, determining a respective sum of measured capacitance values within an identified touch region in the previous capacitive image; and comparing the sums associated with the one or more previous capacitive images and the first sum, and the state of touch of the first capacitive image may be determined based on the comparing.

In some implementations, comparing the sums may include determining at least one of: a change in magnitude of the sums; or a rate of change in the sums.

In some implementations, the method may further include: obtaining sample touch data including one or more of: first touch data associated with at least one first touch input of a first type; second touch data associated with at least one second touch input of a second type; third touch data associated with at least one third touch input that transitions from a touch input of the first type to a touch input of the second type; or fourth touch data associated with at least one fourth touch input that transitions from a touch input of the second type to a touch input of the first type.

In some implementations, the method may further include determining an adjusted threshold value based on the defined threshold value and the sample touch data.

In some implementations, obtaining the sample touch data may include prompting a user to provide the sample touch data via the capacitive interface.

In some implementations, the method may further include: determining a distribution of sums of capacitance values based on touch input data collected from multiple users; and determining a plurality of sensitivity levels based on the distribution, each sensitivity level being associated with a respective threshold sum of capacitance values, and the defined threshold value may correspond to a user selection of one of the sensitivity levels.

In some implementations, the defined threshold value may be determined based on values associated with capacitive frames at or near the beginning of the continuous touch gesture.

In some implementations, the method may further include: determining a touch context associated with the first touch input based on contextual information indicating at least one of task performed or application used; and determining the state of touch of the first capacitive image based on the touch context.

In some implementations, the method may further include obtaining sensor data associated with the first touch input, the sensor data including at least one of audio data captured using a microphone or accelerometer data, and the state of touch of the first capacitive image may be determined based on the obtained sensor data.

In some implementations, the method may further include: receiving, via a computing device, user input of selection of a sensitivity level for detecting at least one state of touch associated with the first capacitive image; responsive to receiving the user input of selection of the sensitivity level, determining an adjusted threshold value based on the defined threshold value and the sensitivity level.

In another aspect, the present application describes a computer-implemented method. The method may include: detecting a first finger touch input on a capacitive interface; determining that the first finger touch input is incomplete; in response to determining that the first finger touch input is incomplete: obtaining sample data of a complete second finger touch input for the capacitive interface; determining a distribution of intensity values along rows of the second finger touch input; determining an adjustment factor based on the distribution and a displacement between the first finger touch input and the second finger touch input; and determining an estimated sum of intensity values for the first finger touch input using the adjustment factor.

In some implementations, determining that the first finger touch input is incomplete may include determining that at least part of a finger associated with the first finger touch input lands outside the capacitive interface based on capacitive sensor data associated with the first finger touch input.

In another aspect, the present application describes an electronic device. The electronic device includes a processor and a memory coupled to the processor. The memory stores processor-executable instructions that, when executed by the processor, are to cause the processor to carry out one or more of the methods described herein.

In yet another aspect, the present application describes a non-transitory computer readable storage medium. The computer readable storage medium contains computer-executable instructions thereon which, when executed, configure a processor to carry out one or more of the methods described herein.

According to another aspect, there is provided an apparatus, wherein the apparatus comprises a processor and a memory storing one or more instructions that is capable of being run on the processor, and when the one or more instructions are run, the apparatus is enabled to perform any of the methods described herein.

According to another aspect, there is provided an apparatus, wherein the apparatus comprises a function or unit to perform any of the methods described herein.

According to another aspect, there is provided a computer readable storage medium, comprising one or more instructions, wherein when the one or more instructions are run on a computer, the computer performs any of the methods described herein.

According to another aspect, there is provided a device configured to perform any of the methods described herein.

According to another aspect, there is provided a processor, configured to execute instructions to cause a device to perform any of the methods described herein.

According to another aspect, there is provided an integrated circuit configure to any of the methods described herein.

Other aspects and features of the present application will be understood by those of ordinary skill in the art from a review of the following description of examples in conjunction with the accompanying figures. Example implementations of the present application are not limited to any particular operating system, system architecture, mobile device architecture, server architecture, or computer programming language.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

BRIEF DESCRIPTION OF THE DRAWINGS

Implementations are described in detail below, with reference to the following drawings.

Like reference numerals are used in the drawings to denote like elements and features.

DETAILED DESCRIPTION OF THE EMBODIMENTS

Touchscreen devices implementing capacitive sensing are equipped with a capacitive touch sensor. A capacitive sensor may be composed of a grid of sensing electrodes. When a conductive object, such as a finger or stylus, is brought close to or in contact with the touchscreen, multiple cells in the grid can be activated. The signal output from the capacitive sensor can be read as a two-dimensional array, or frame, of capacitance data. In particular, each element in the array corresponds to the capacitance value of a cell in the capacitive sensor.

Figure 1B:
FIG. 1B shows example capacitive sensor data associated with a touch input on the touchscreen of FIG. 1A.
Figure 1A:
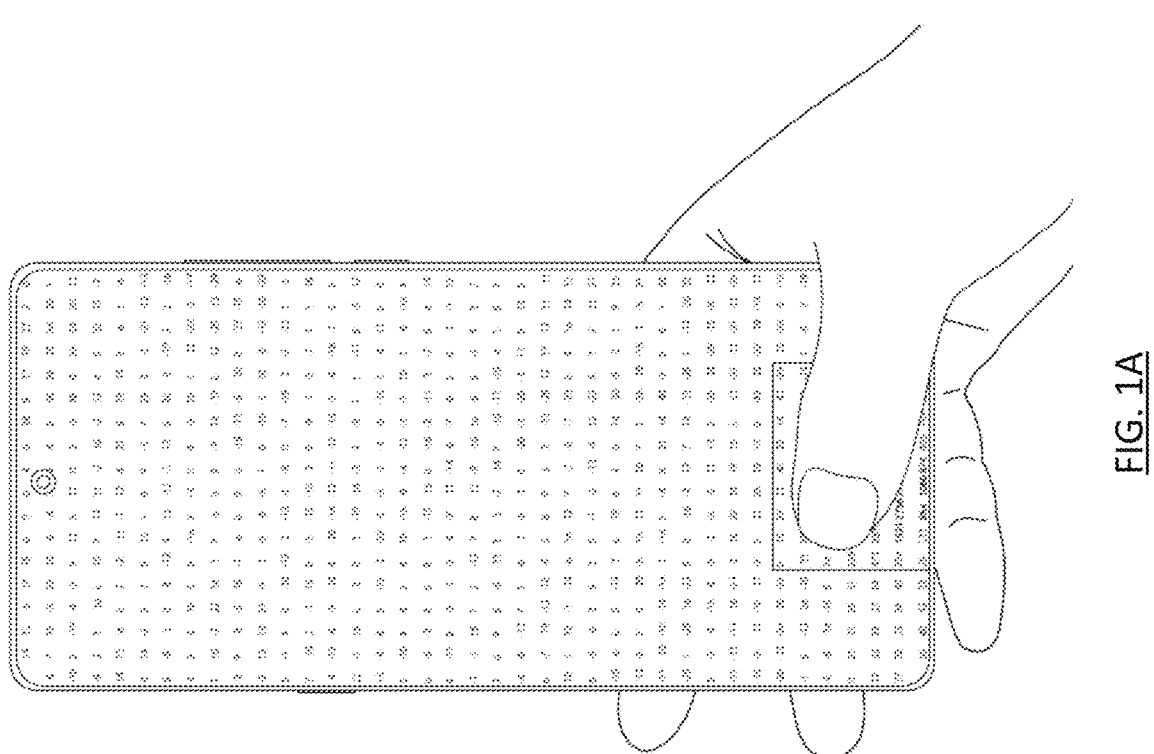
FIG. 1A shows a user interacting with an example touchscreen of an electronic device.

The capacitance values can be read as raw measurements and subsequently processed to obtain a "capacitive image". The pixel values of a capacitive image represent the differences in electrical capacitance between a baseline measurement (when no touch is inputted on the touchscreen) and a measurement of capacitance at a given instance of touch input. Various information about the object's interaction with the touchscreen during a touch input may be represented by a sequence of capacitive images. FIG. 1A shows a user interacting with a touchscreen of an electronic device. The user provides a touch input on the touchscreen using their thumb. An example capacitive image 110 corresponding to the touch input is shown in FIG. 1B.

By enhancing the richness of touch interaction data, a wide range of applications may be possible on electronic devices with capacitive interfaces, such as a touchscreen. The force of a touch input, i.e., the force with which a touch input is applied on a capacitive interface, is one example of a feature which may increase the dimensionality of touch interaction data. The ability to classify the force of touch inputs may enable various applications on user devices that are not supported by traditional touch input data (e.g., two-dimensional touch location, duration of touch gesture, etc.). For example, different actions could be triggered depending on whether a user contacts the touchscreen normally (a "normal touch") or heavier than normal, i.e., with an applied force (e.g., using a finger) that exceeds a threshold level (a "heavy press").

Previous attempts at adding a pressure dimension to the touch input space have proceeded by different mechanisms. With its 3D Touch technology, Apple introduced a new sensing layer, using a pressure sensor to detect pressure of touch inputs. Varying levels of pressure in touch could be measured using a pressure sensor and the different pressure/force could trigger different actions. Other solutions, such as Deep Touch, have used capacitive sensors on electronic devices to estimate touch pressure. When force is applied, the part of finger in contact with the screen deforms and expands. This deformation can be detected using the changes in data received from a capacitive sensor.

Each of these previously proposed solutions has its own limitations. For Apple's 3D Touch, additional sensors (i.e., pressure sensors) are required to be installed on devices, increasing production cost and hardware complexity. Deep Touch only classifies a short sequence of frames (e.g., only taps) into different press force categories, such as normal or heavy. This limits the scope of user interaction; for example, it does not allow for detecting a touch interaction that transitions from heavy press to normal touch without lifting the input finger from the touchscreen.

The present application describes methods for classifying touch inputs on a capacitive interface. In accordance with disclosed embodiments, the force state (i.e., class of applied force) of a touch gesture may be determined continuously during the touch gesture. In particular, the force state may be continuously predicted even when the touch gesture alternates between different states, such as "normal touch" and "heavy press". The proposed methods enable predicting the intended force state of touch using a sequence of frames, or "capacitive images", from a capacitive sensor. The capacitive images correspond to touch inputs that are detected during the continuous touch gesture. The force state of each such detected touch input may be classified. Various approaches for using capacitive sensor data to predict the force state of touch during a continuous touch gesture are described herein.

The present application also describes techniques for updating decision boundaries for classifying touch states and calibrating a capacitive interface, such as a touchscreen, based on touch samples collected from users of the capacitive interface. In particular, a system to provide ability for users to explicitly or implicitly calibrate the touch state classification model for their custom data is proposed. As will be explained in greater detail below, in some implementations, the capacitive sensor data may be combined with other modalities in order to determine force state of touches.

Figure 2:
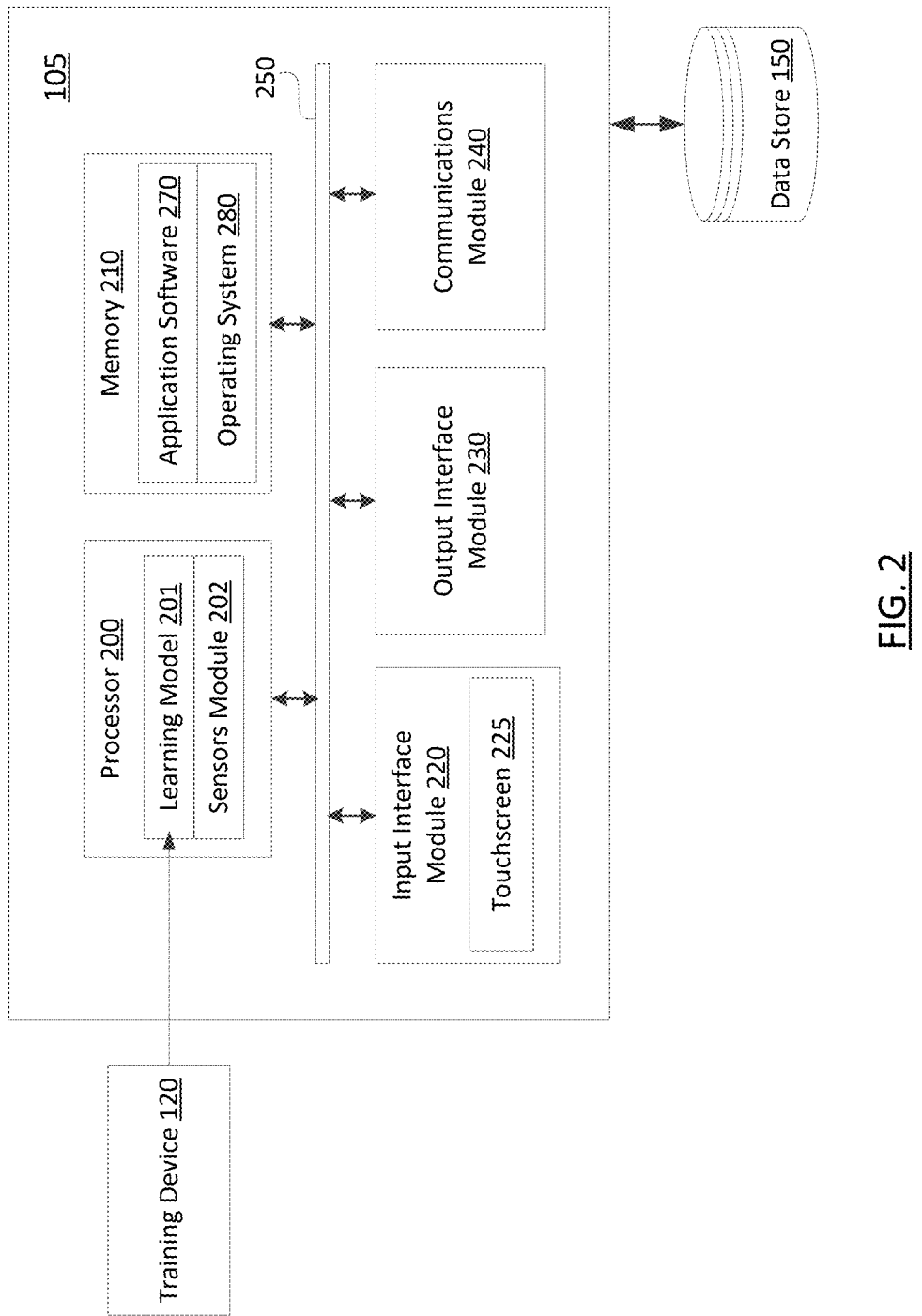
FIG. 2 is a schematic diagram of a system architecture in accordance with an example implementation of the present disclosure.

Reference is made to FIG. 2 which is a schematic diagram of a system architecture in accordance with an example implementation of the present disclosure. The training device 120 is configured to obtain training data. For the touch state classification methods of the present application, the training data may include capacitive images associated with touch inputs and their ground truth positions. The training data is collected from users of the electronic device 105. In particular, the capacitive images correspond to touch inputs that are received at the electronic device 105, for example, on a touchscreen 225.

The training device 120 obtains a machine learning model by performing training based on the training data. A machine learning model refers to a type of mathematical model that can learn from labeled training data and generalize to unseen datasets. More particularly, a trained machine learning model can be used to make predictions or classifications on new data. During the training phase, a learning algorithm adjusts the model's parameters to minimize the difference, or empirical risk, between the predicted output and the actual target values in a given dataset. A neural network is a machine learning model that makes decisions in a manner similar to the human brain, by using processes inspired by the structure and function of biological neural networks. Neural networks are classified into different types, such as convolutional neural networks and recurrent neural networks, and can be used for various tasks including predictive modeling, pattern recognition, and generative artificial intelligence (AI). It will be understood that the model training functions of the training device 120 may be implemented by or in conjunction with the electronic device 105. For example, in at least some implementations, the training device 120 and the electronic device 105 may be the same device.

In order to collect capacitive images that are labeled with a respective applied pressure, users of the electronic device 105 may be prompted to provide touch inputs on the touchscreen 225 with varying levels of force. For example, users may be instructed to complete various tasks by applying different pressure levels on the touchscreen 225. The tasks may require users to provide touch inputs that fall into two or more distinguishable force states (e.g., normal versus heavy). The users may not be expected to apply exact pressure (i.e., pressure of defined values/ranges). In some implementations, a digital weighing scale (for retrieving pressure applied by the users) may be used in conjunction with the capacitive sensor of the touchscreen 225 to obtain the training data. Training based on actual user inputs enables the machine learning model to capture essential features of human touch behavior. The touch data collected from users may be split into a training set and a test set.

The trained learning model can be used to implement the touch state classification methods of the present disclosure. As illustrated in the schematic diagram of FIG. 3, each capacitive image associated with a touch input undergoes pre-processing prior to being inputted to the machine learning model 300 which may, in at least some implementations, comprise a convolutional neural network and a recurrent neural network. The processed capacitive image is inputted to the machine learning model 300 to determine a force state of the touch input. In particular, the output of the machine learning model 300 may comprise a class (e.g., "heavy press", "normal touch", etc.) for a given frame (of capacitive sensor data) of a continuous touch gesture on the touchscreen 225. That is, the machine learning model 300 is configured to predict the force state of each of one or more capacitive frames associated with the continuous touch gesture.

The electronic device 105 includes a variety of modules. For example, the electronic device 105, may include a processor 200, a memory 210, an input interface module 220, an output interface module 230, and a communications module 240. As shown in FIG. 2, the modules of the electronic device 105 may be in communication over a bus 250.

The processor 200 is a hardware processor. The processor 200 may, for example, be one or more ARM, Intel x86, PowerPC processors, or the like. The processor 200 may comprise a set of modules that are implemented in firmware, software, or a combination thereof. Example modules include hardware operation modules for operating hardware (e.g., sensor electrodes, displays, etc.); data processing modules for processing data, such as sensor signals; and reporting modules for reporting information to other components of the electronic device 105.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the electronic device 105.

The input interface module 220 enables the electronic device 105 to receive input signals. Input signals may correspond to input received from a user of the electronic device 105. The input interface module 220 may serve to interconnect the electronic device 105 with one or more input devices. In particular, input signals may be received from input devices via the input interface module 220. Input devices may, for example, include one or more of: a touchscreen 225, keyboard, trackball, or the like. In some implementations, all or a portion of the input interface module 220 may be integrated with an input device. For example, the input interface module 220 may be integrated with one of the aforementioned input devices.

The touchscreen 225 implements one or more sensing technologies for detecting user input. Examples of sensing technologies include capacitive, resistive, optical, and surface acoustic wave sensing. The touchscreen 225 is configured to sense touch input provided by input objects, such as fingers and styli. The touchscreen 225 typically integrates both an input and an output (e.g., display) device. Users can interact directly with displayed information on the touchscreen 225, by means of touch inputs, rather than using a peripheral device such as a mouse or touchpad.

The touchscreen 225 may, in some implementations, be a capacitive interface. In capacitive implementations of the touchscreen 225, arrays of capacitive sensing elements, such as sensor electrodes, are used to create electric fields. Inputs on the touchscreen 225 can be detected by measuring the capacitance at each addressable electrode. When an input object makes contact with, or is in close proximity to, the touchscreen 225, it disturbs the electrostatic fields of the electrodes and alters the capacitance. The change in capacitance can be measured and converted into coordinates that the processor 200 can use to detect touch input. Capacitive sensing, such as may be implemented on touchscreen 225, will now be described in greater detail.

Projected capacitance touch (PCT) is the prevalent variant of capacitive sensing technology. A capacitive sensor grid may be formed either by etching a conductive layer to form a grid pattern of sensor electrodes, or by etching two separate, parallel layers of conductive material with perpendicular tracks to form the grid. There are two types of PCT: mutual capacitance and self-capacitance. Self-capacitance sensing is based on detecting changes in the capacitive coupling between sensor electrodes and an input object. When an input object is brought near the touchscreen 225, the electric field near the sensor electrodes is caused to be altered, changing the measured capacitive coupling. In some implementations, self-capacitance sensing may involve modulating sensor electrodes with respect to a reference voltage (e.g., system ground) and detecting the capacitive coupling between the sensor electrodes and input objects.

Mutual capacitance sensing is based on detecting changes in the capacitive coupling between sensor electrodes, specifically row and column electrodes. Mutual capacitive sensors have a capacitor at each intersection of the rows and columns of the capacitive sensor grid. Voltage is applied to the rows or columns. Bringing an input object near the touchscreen 225 changes the local electric field, which reduces the mutual capacitance. Mutual capacitance allows multi-touch operations in which the interaction of multiple input objects with the touchscreen 225 can be accurately tracked at the same time.

The processor 200 is configured to operate the hardware of the touchscreen 225 to detect touch inputs. Additionally, the processor 200 may operate the sensing elements of the touchscreen 225 (for example, via the sensor module 210) to produce electrical signals indicative of input. The processor 200 may also be configured to digitize analog electrical signals obtained from sensor electrodes, perform filtering or other signal conditioning, and determine touch positional information.

The capacitive sensor grid comprising sensor electrodes may be patterned as an array that includes a plurality of first electrodes and a plurality of second electrodes that are disposed perpendicular to the first electrodes. For example, the first electrodes and the second electrodes may be arranged in a matrix array. The first electrodes and the second electrodes are typically electrically isolated from each other, for example, by positioning insulators to separate the electrodes and prevent them from shorting to each other.

The areas of localized capacitive coupling between first sensor electrodes and second sensor electrodes may be referred to as "capacitive pixels." The capacitive couplings between the first sensor electrodes and second sensor electrodes change with the proximity and motion of input objects in a sensing region associated with the first sensor electrodes and second sensor electrodes.

The sensor pattern may be "scanned" to determine the capacitive couplings. In particular, the first sensor electrodes may be driven to transmit transmitter signals. Transmitters may be operated such that one sensor electrode transmits at one time, or multiple sensor electrodes transmit at the same time. Where multiple sensor electrodes transmit simultaneously, these multiple sensor electrodes may transmit the same transmitter signal and produce an effectively larger sensor electrode, or these multiple sensor electrodes may transmit different transmitter signals. For example, multiple sensor electrodes may transmit different transmitter signals according to one or more coding schemes that enable their combined effects on the resulting signals of second sensor electrodes to be independently determined.

The receiver second sensor electrodes may be operated singly or multiply to acquire the resulting signals. The resulting signals may be used to determine measurements of the capacitive couplings at the capacitive pixels.

A set of measurements from the capacitive pixels form a "capacitive image" (or "capacitive frame") representative of the capacitive couplings at the pixels. Multiple capacitive images may be obtained over multiple time periods, and differences between them can be used to derive information about touch inputs on the touchscreen 225. For example, successive capacitive images obtained over successive periods of time can be used to track the motion(s) of one or more input objects entering, exiting, and within a defined sensing region of the touchscreen 225.

The background capacitance of the capacitive sensor is the capacitive image associated with no touch input. The background capacitance changes with the environment and operating conditions, and may be estimated in various ways. For example, "baseline images" may be obtained when no input object is determined to be in a sensing region of the touchscreen 225, and the baseline images may be used as estimates of their background capacitances.

Capacitive images may be adjusted for the background capacitance of the capacitive sensor for more efficient processing. This can be accomplished by "baselining" measurements of the capacitive couplings at the capacitive pixels to produce a "baselined capacitive image." The measurements forming a capacitance image may be compared with appropriate "baseline values" of a "baseline image" associated with those pixels, and changes from that baseline image can be determined.

In some implementations, the "capacitive frame rate" (the rate at which successive capacitive images are acquired) may be the same or be different from that of the "display frame rate" (the rate at which the display image is updated, including refreshing the screen to redisplay the same image). In some implementations where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region of the touchscreen 225. This is more likely where the capacitive sensing and display updating electrodes are in close proximity to each other, or when they are shared (e.g., combination electrodes).

For simplicity, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, the capacitive images acquired cycle through the frame types and repeat.

The output interface module 230 enables the electronic device 105 to provide output signals. Some output signals may, for example, allow provision of output to a user of the electronic device 105. The output interface module 230 may serve to interconnect the electronic device 105 with one or more output devices. Output signals may be sent to output devices via the output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some implementations, all or a portion of the output interface module 230 may be integrated with an output device. For example, the output interface module 230 may be integrated with one of the aforementioned example output devices.

The communications module 240 enables the electronic device 105 to communicate with other electronic devices and/or various communications networks. For example, the communications module 240 may allow the electronic device 105 to send or receive communications signals. Communications signals may be sent or received according to one or more protocols or according to one or more standards. For example, the communications module 240 may allow the electronic device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like.

Additionally, or alternatively, the communications module 240 may enable the electronic device 105 to communicate using, for example, near-field communication (NFC), via Wi-Fi, using Bluetooth™ or via some combination of one or more networks or protocols. In some implementations, all or a portion of the communications module 240 may be integrated into a component of the electronic device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

The operating system 280 is software. The operating system 280 allows the application software 270 to access the processor 200, the memory 210, the input interface module 220, the output interface module 230 and the communications module 240. The operating system 280 may be, for example, Apple iOS™, Google Android™, Linux™, Microsoft Windows™, or the like.

As illustrated, the software components stored in memory 210 include application software 270 and an operating system 280. The application software 270 adapts the electronic device 105, in combination with the operating system 280, to operate as a device performing particular functions.

Figure 3:
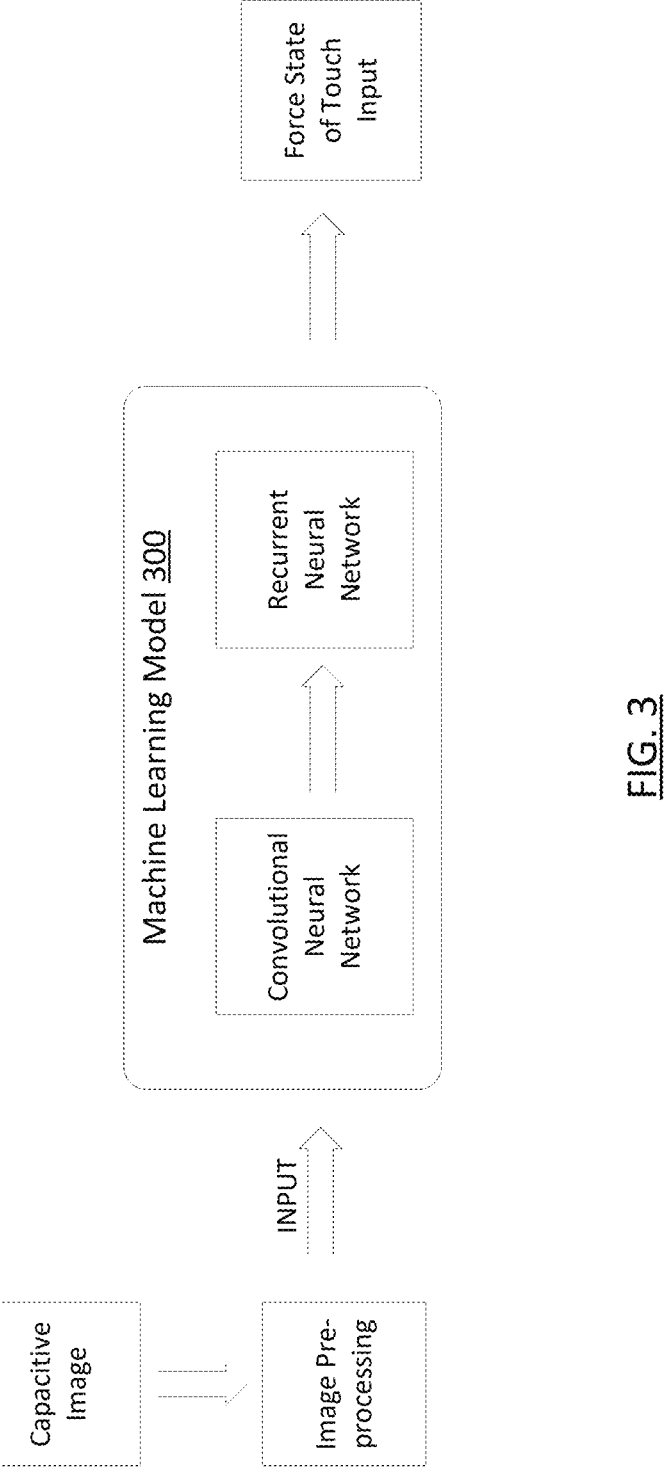
FIG. 3 is a schematic diagram of an example process for classifying touch inputs on a capacitive interface.

Reference is now made to FIG. 3, which illustrates an example system architecture for implementing the disclosed methods for classifying force state of touch inputs on a capacitive interface. A capacitive interface refers to a human interface device (e.g., touchscreen, touchpad, etc.) that is based on capacitive sensing technology. Specifically, a capacitive interface uses capacitive sensors that are equipped to measure changes in capacitance for detecting presence and/or proximity of objects. A capacitive interface is configured to detect inputs, such as touch inputs, that are registered using an input device (e.g., finger, stylus, etc.) on the interface.

A convolutional neural network is a type of deep learning model for processing data that has a grid pattern and which is designed to learn spatial hierarchies of features. Specifically, a convolutional neural network is a mathematical construct that is typically composed of three types of layers: convolution, pooling, and fully connected layers. The first two, convolution and pooling layers, perform feature extraction, whereas the third, a fully connected layer, maps the extracted features into a final output, such as classification. A convolution layer plays a key role in a convolutional neural network, which is composed of a stack of mathematical operations, such as convolution, a specialized type of linear operation. In digital images, pixel values are stored in a two-dimensional (2D) grid, i.e., an array of numbers. A small grid of parameters called kernel, an optimizable feature extractor, is applied at each image position. This makes convolutional neural networks highly efficient for image processing, since a feature may occur anywhere in the image. As one layer feeds its output into the next layer, extracted features can hierarchically and progressively become more complex. The process of optimizing parameters, such as kernels, is called training, which is performed so as to minimize the difference between outputs and ground truth labels through an optimization algorithm (such as backpropagation, gradient descent, etc.).

The convolution layers perform feature extraction, which typically consists of a combination of linear and nonlinear operations, i.e., convolution operation and activation function.

The outputs of a linear operation such as convolution are then passed through a nonlinear activation function. Although smooth nonlinear functions, such as sigmoid or hyperbolic tangent (tanh) function, were used previously because they are mathematical representations of a biological neuron behavior, the most common nonlinear activation function used presently is the rectified linear unit (ReLU).

A pooling layer provides a typical down-sampling operation which reduces the in-plane dimensionality of the feature maps in order to introduce a translation invariance to small shifts and distortions, and decrease the number of subsequent learnable parameters. There is no learnable parameter in any of the pooling layers, whereas filter size, stride, and padding are hyperparameters in pooling operations, similar to convolution operations.

The most popular form of pooling operation is max pooling, which extracts patches from the input feature maps, outputs the maximum value in each patch, and discards all the other values. A max pooling with a filter of size 2×2 with a stride of 2 is commonly used in practice. This down-samples the in-plane dimension of feature maps by a factor of 2. Unlike height and width, the depth dimension of feature maps remains unchanged.

The output feature maps of the final convolution or pooling layer are typically flattened, i.e., transformed into a one-dimensional (1D) array of numbers (or vector), and connected to one or more fully connected layers, also known as dense layers, in which every input is connected to every output by a learnable weight. Once the features extracted by the convolution layers and down-sampled by the pooling layers are created, they are mapped by a subset of fully connected layers to the final outputs of the network, such as the probabilities for each class in classification tasks. The final fully connected layer typically has the same number of output nodes as the number of classes. Each fully connected layer is followed by a nonlinear function, such as ReLU, as described above.

A recurrent neural network is used to process sequence data. In a recurrent neural network, current output of a sequence is related to previous output(s). The network "memorizes" previous information and applies the previous information to calculation of the current output. More specifically, nodes in the hidden layer are no longer unconnected, but are connected, and input for the hidden layer includes not only output of the input layer but also output of the hidden layer at a previous moment. Theoretically, the recurrent neural network can process sequence data of any length. The recurrent neural network is designed to enable a machine to have a capability to "remember", like the human brain. The output of the recurrent neural network depends on current input information and historical memory information.

Figure 4:
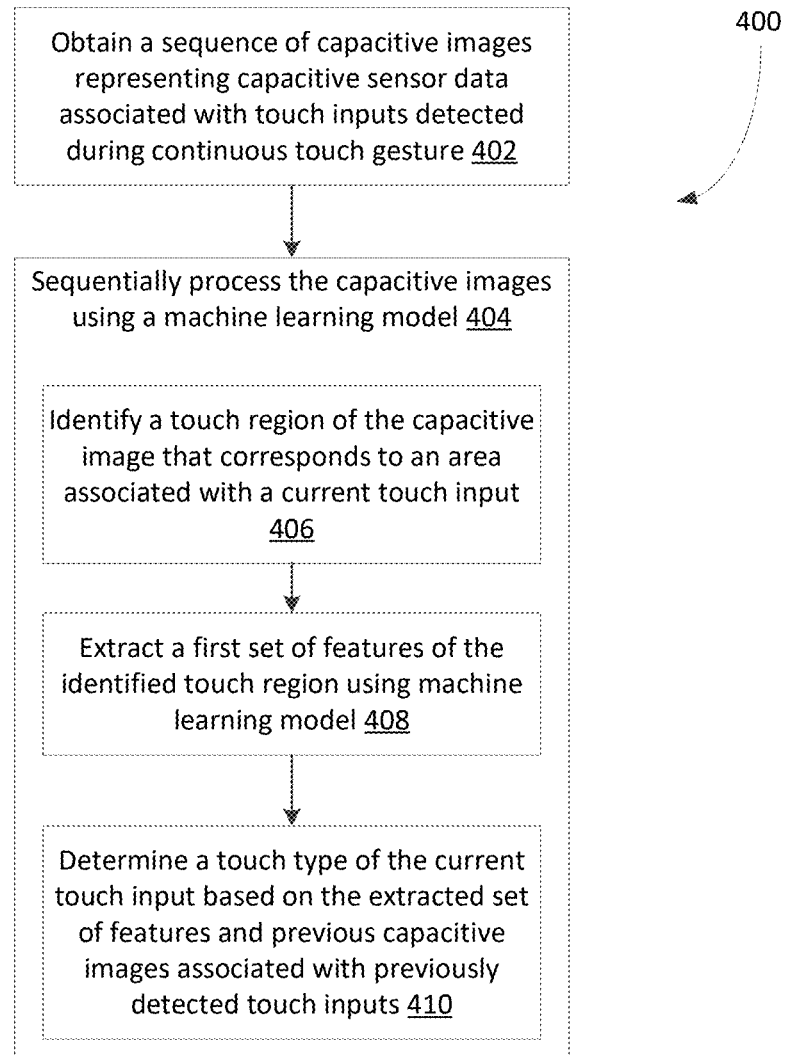
FIG. 4 shows, in flowchart form, an example learning-based method for continuously estimating an intended state of touch during a touch gesture on a capacitive interface.

Reference is now made to FIG. 4 which shows, in flowchart form, an example learning-based method 400 for continuously estimating an intended state of touch during a touch gesture on a capacitive interface. The method 400 may be implemented by an electronic device having a capacitive interface. For example, the processor 200 of an electronic device 105 (FIG. 2) that is equipped with a capacitive touchscreen may be configured to perform the operations of method 400. The operations may be performed by the processor 200 executing software comprising instructions such as may be stored in the memory 210 of the electronic device 105. Specifically, processor-executable instructions may, when executed, configure the processor 200 of the electronic device 105 to perform all or parts of the method 400.

In operation 402, the processor obtains a sequence of capacitive images associated with a continuous touch gesture on the capacitive interface. The capacitive images represent capacitive sensor data associated with touch inputs that are detected during the continuous touch gesture, such as a force-based press gesture. The capacitive interface may be, for example, a touchscreen of the electronic device. The continuous touch gesture may comprise a sequence of touch inputs which are continuously detected on the capacitive interface, and each of the capacitive images may correspond to a respective one of the touch inputs.

The continuous touch gesture may be detected by the processor based on readings acquired by a capacitive sensor associated with the electronic device. When an input object, such as a user's finger or stylus, is brought close to or in contact with the capacitive interface, the capacitive sensor may obtain measurements of changes in capacitance. A continuous touch gesture can be detected based on the capacitance measurements. In particular, upon receiving the capacitive sensor readings indicating a change in capacitance, the processor may determine that a touch has been inputted on the capacitive interface.

The processor may then obtain a sequence of capacitive images associated with the detected continuous touch gesture, either by automatically receiving the capacitive images or by accessing capacitive image data of the capacitive sensor. In some implementations, responsive to measuring a change in capacitance, the capacitive sensor may automatically provide the capacitive images associated with the detected continuous touch gesture to the processor.

The capacitive images may be sequentially processed using a machine learning model (operation 404). In at least some implementations, the machine learning model includes a convolutional neural network layer and a recurrent neural network layer. For each image in the sequence of capacitive images, the processor may perform, at least, operations 406 through 410 for classifying the force state of a current touch input corresponding to said image. In particular, for a given capacitive image, the operations 406 through 410 may be performed to output a class of applied force for the current touch input that is captured by the capacitive image. In this way, the intended force state of touch may be continuously classified throughout a touch gesture on the capacitive interface.

For a given capacitive image, the processor first identifies a "touch region" of the capacitive image (operation 406). The touch region corresponds to an area of the capacitive interface that is associated with a current touch input for the capacitive image. More specifically, the touch region represents an area of contact between an input object and the capacitive interface for the current touch input. In order to identify the touch region, the processor may determine, based on the capacitive sensor data, a region of the capacitive image that is associated with sensor signal strength indicating the current touch input. In particular, the touch region is a region associated with higher sensor signal level (or signal strength exceeding a defined threshold) than other regions of the capacitive image. For example, the touch region contains at least the cells associated with capacitance values that exceed a defined threshold value. FIG. 1B shows an example representation of a touch region corresponding to a detected touch input, as depicted in the capacitive image 110.

The processor further determines a sub-image of the capacitive image that contains the touch region. That is, a sub-image containing those portions of the capacitive image corresponding to the touch region is determined by the processor. For example, the sub-image may be an area of fixed shape and/or size in the capacitive image, and positioned so as to contain the touch region within it. An example sub-image 150 is illustrated in FIG. 1B. The sub-image 150 is a rectangle of fixed size that contains the touch region.

Figure 7:
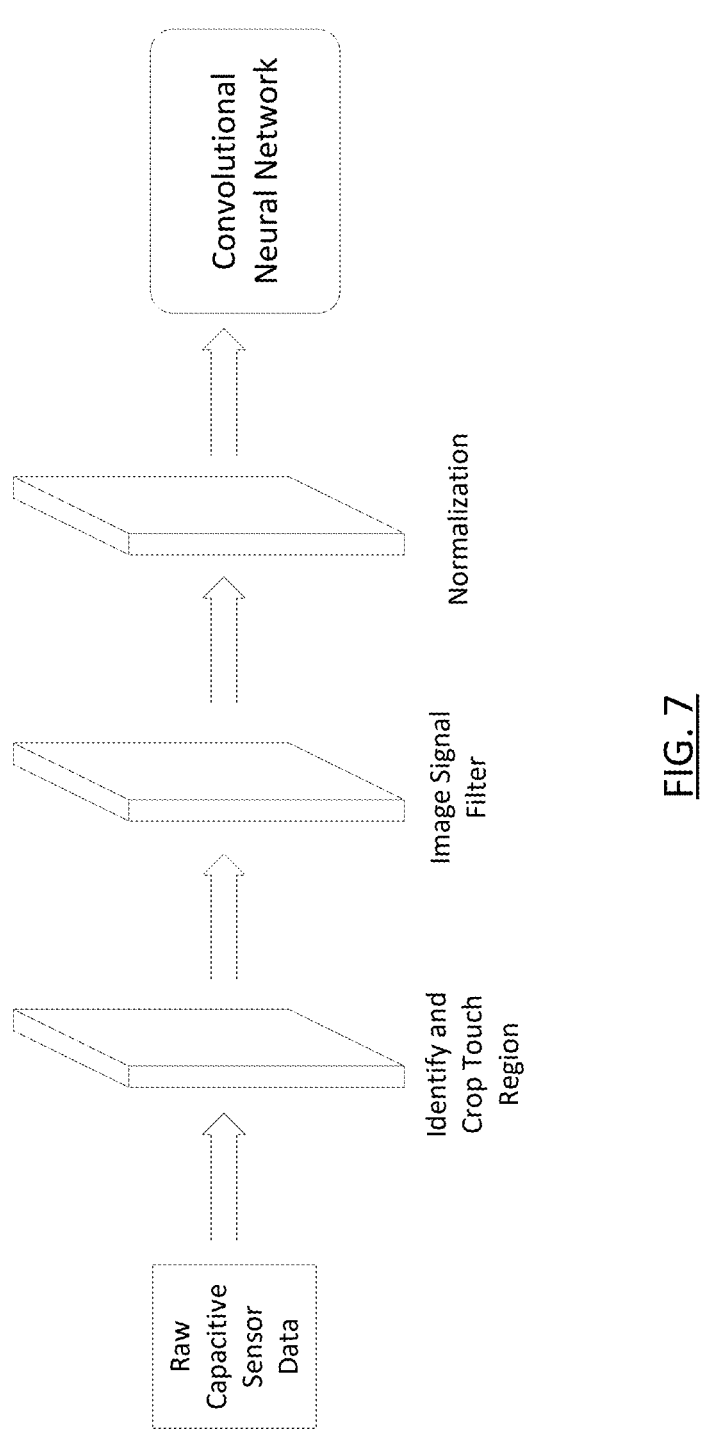
FIG. 7 shows example operations which may be performed for pre-processing a capacitive image.

The operation of identifying the touch region associated with the current touch input may be performed as part of a step for pre-processing the capacitive image. FIG. 7 illustrates exemplary operations for pre-processing a capacitive image prior to providing it as input to a trained neural network. The pre-processing of the capacitive image includes finding a region of interest, i.e. the touch region, and "cropping" around the region. The cropped region of the capacitive image is then normalized and passed through an image signal filter, such as a high-pass filter, for noise removal.

The processor first obtains a capacitive image representing raw capacitive sensor data at the time of detecting the current touch input. A sub-image of the capacitive image that contains the region of touch is identified and cropped. The touch region is distinguishable in the capacitive image data. Specifically, the touch region is an area of the capacitive image that spans multiple pixels where the sensor signal strength is higher (or greater than a defined threshold) relative to other areas of the capacitive image. The number of pixels may depend on, among others, sensor pitch and finger size and pose. The processor crops a sub-image containing the touch region, i.e., removes all other portions of the capacitive image from consideration.

In some implementations, the sub-image may be an area of fixed shape and/or dimensions containing the identified touch region. For example, the processor may crop an n×n region around the touch region, where n can be set to be fixed or variable. The cropped sub-image can be rotated to compensate for the orientation of device, for example, if the device is held in landscape orientation.

As shown in FIG. 7, the processor may also apply an image signal filter to the capacitive image data, specifically the sub-image containing the touch region. In at least some implementations, the image signal filter may be a high-pass filter. The high-pass filter only passes signals with an amplitude exceeding a certain cutoff amplitude. This step attenuates signals with amplitudes lower than the cutoff from the capacitive pixel data inside the crop region. For example, the processor may set the value of all low-amplitude (intensity) pixels to o. In this way, the cropped sub-image of the capacitive image may be filtered to remove low-amplitude noise, producing a filtered sub-image.

The processor may also normalize the filtered sub-image containing the touch region. For example, the sub-image may be normalized to have values between 0 and 1, or to have o mean and unit standard deviation. This step involves removing any bias value(s) and scaling the sub-image by a defined scaling factor. The bias and scale can be fixed and decided based on values received from the capacitive sensor. The bias and scale can also be dynamically determined to have, for example, o mean and unit standard deviation in data. The processor determines the normalized sub-image and outputs it as the output of the pre-processing step.

Referring back to FIG. 4, the processor extracts a first set of features of the identified touch region using a trained machine learning model, in operation 408. The machine learning model may, for example, include a convolutional neural network implemented by the processor. The processor provides the pre-processed sub-image of the capacitive image as input to the machine learning model. In particular, the output of the pre-processing, i.e., a filtered and normalized sub-image of the capacitive image, is fed into the convolutional neural network. The backbone layers of the convolutional neural network, which may include a plurality of convolution and pooling layers, perform feature extraction on the sub-image.

The convolutional neural network is trained using touch data collected from users of the electronic device. The training data includes capacitive images associated with users' touch inputs as well as the ground truth positions of the touches. During training, the capacitive images resulting from users' touches may be logged and stored in memory.

In operation 410, the processor determines a state of touch of the capacitive image based on the extracted first set of features and one or more previous capacitive images associated with previously detected touch inputs during the continuous touch gesture. The state of touch indicates an intended amount of applied force associated with the current touch input. For example, the state of touch may comprise a class of applied force, such as "heavy press" or "normal touch". In at least some implementations, the state of touch of the capacitive image may be determined by providing the extracted first set of features and the one or more previous capacitive images as input to the recurrent neural network layer. The set of features extracted from a capacitive image using the convolutional neural network layer may be input one at a time through the recurrent neural network layer, i.e., as they are received from the sensor. The recurrent neural network "remembers" the useful features through its hidden states which capture historical information of the sequence of capacitive images. The output of the recurrent neural network layer is a class, or force state, of the capacitive image representing an intended amount of applied force associated with the current touch input.

It will be understood that the state of touch for a touch gesture can be predicted continuously. In particular, the state of touch can be classified continuously based on the determined touch states of capacitive frames associated with a touch instance. In at least some implementations, the state of touch may be represented by a continuous function that alternates between two (or more) discrete states corresponding to an amount of force applied (e.g., normal touch, heavy press). The processor may be configured to extrapolate the continuous function based on the discrete states that are determined for capacitive frames associated with the touch instance.

Additionally, or alternatively, a continuous function may be determined based on output values representing the force applied in a touch instance. As described in detail herein, the state of touch may be determined using methods involving sums of capacitance values, rates of change in capacitance value sums, or learning-based techniques. A continuous function may be defined over the relevant output value (e.g., capacitance value sum, rate of change in capacitance value sum, output of neural network). In particular, the processor may be configured to extrapolate a continuous function using discrete output values associated with capacitive frames of a touch instance. By using a suitable threshold, the state of touch may be determined based on the continuous function at each point in time during the touch instance. In particular, the state of touch may be one of: normal touch; heavy press; or a transition state between normal touch and heavy press (e.g., normal touch to heavy press, or heavy press to normal touch).

Figure 5:
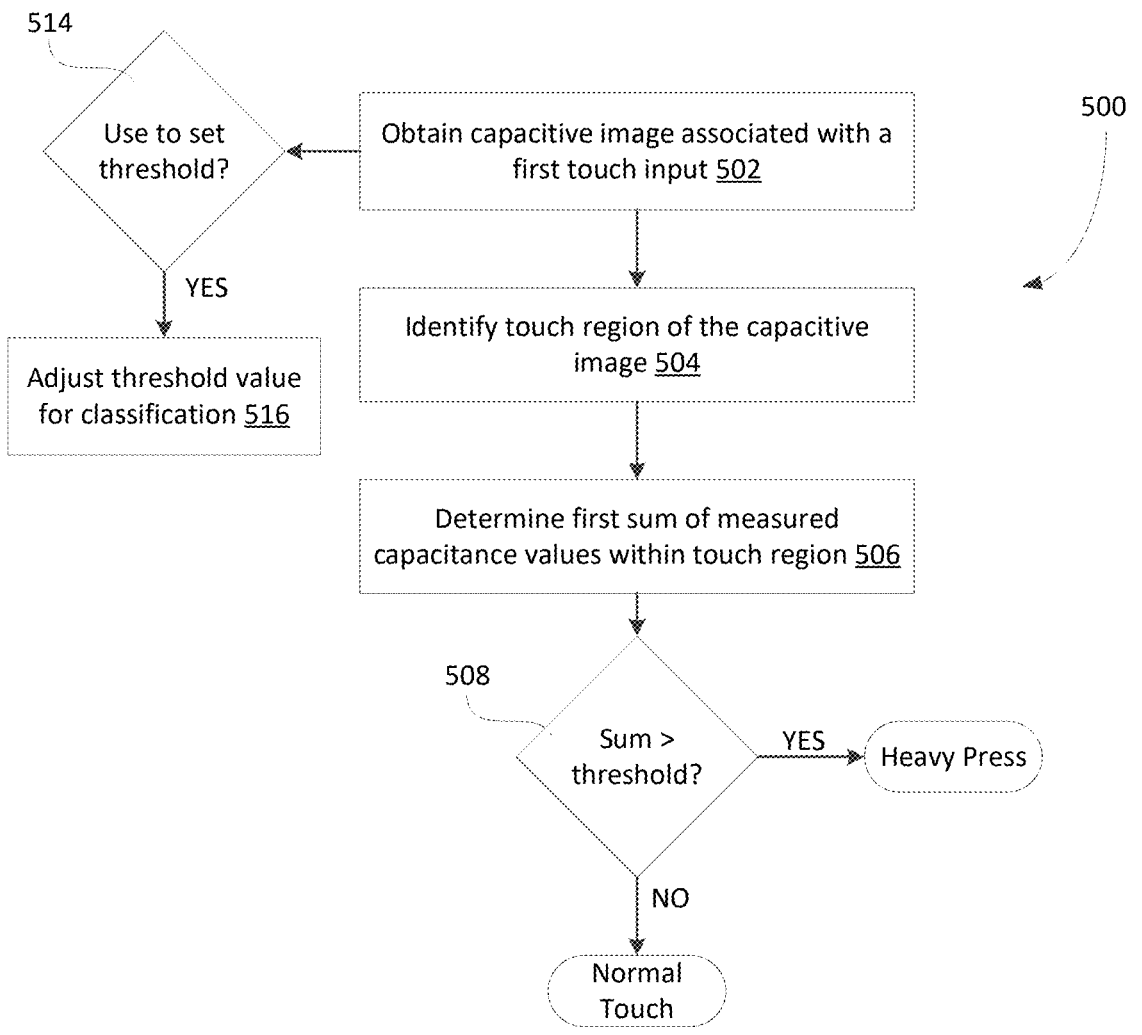
FIG. 5 shows, in flowchart form, an example method for estimating an intended state of touch during a touch gesture on a capacitive interface using sums of capacitance values.

Reference is now made to FIG. 5 which shows, in flowchart form, an example method 500 for estimating an intended state of touch during a touch gesture on a capacitive interface using sums of capacitance values. The method 500 may be implemented by an electronic device having a capacitive interface. For example, the processor 200 of an electronic device 105 (FIG. 2) that is equipped with a capacitive touchscreen may be configured to perform the operations of method 500. In some implementations, the operations of method 500 may be performed in addition to, or as alternatives of, one or more of the operations of method 400.

In operation 502, the processor obtains a first capacitive image representing capacitive sensor data associated with a first touch input detected during a continuous touch gesture on the capacitive interface. The continuous touch gesture may comprise a sequence of touch inputs which are continuously detected on the capacitive interface, and each detected touch input may correspond to a respective capacitive image. More particularly, a continuous touch gesture may be associated with a sequence of a plurality of capacitive images corresponding to detected touch inputs, and the first capacitive image may be one of the images in the sequence.

The processor identifies a touch region of the first capacitive image, in operation 504. The touch region corresponds to an area of the capacitive interface associated with the detected first touch input. The identification of the touch region may be performed in a similar manner as operation 406 described above.

The sum of values of active pixels in capacitance data has a direct correlation with the area of the capacitive interface that is under touch. In operation 506, the processor determines a sum of measured capacitance values within the identified touch region. Whenever applied force for a touch input is increased, the part of finger in contact with the capacitive interface expands, and this can be detected based on the sum of measured capacitance values in the touch region.

The computed sum is compared against a defined threshold value in order to classify the force state of the first touch input. In operation 508, the processor determines a state of touch of the first capacitive image at the first time based on comparing the sum against the threshold value. If the sum is greater than the threshold value, the processor determines that the first touch input is associated with a first type (i.e., "heavy press"). On the other hand, if the sum is less than or equal to the threshold value, the processor determines that the first touch input is associated with a second type (i.e., "normal touch").

The state of touch relates to an amount of applied force associated with the detected first capacitive image. As such, the state of touch may be expressed in various ways that describe the force applied by the touch. In some implementations, the state of touch may be one of a predefined set of discrete classes, such as "normal touch" or "heavy press". Alternatively, the state of touch may be expressed in relative terms, e.g., lighter than a normal touch, heavier than a normal touch, etc.

In some implementations, capacitance data may be combined with other modalities that are available on the electronic device in order to predict the force state of a touch input. In particular, the processor may be configured to determine a touch context associated with the detected touch input. The touch context may be determined based on contextual information indicating, for example, at least one of task performed or application used on the electronic device at the time of touch input. The integration of additional modalities may facilitate classifying touch states with greater robustness, particularly in certain edge cases. The contextual information may, in some implementations, be used as part of training data for the neural network(s).

Furthermore, the processor may be configured to obtain sensor data associated with the detected touch input. The sensor data may, for example, comprise output data of one or more sensors that are resident on the electronic device. In at least some implementations, the sensor data may be used in determining the state of touch of a capacitive image. Sensor data may include, for example, audio data captured using a microphone at or near the time of touch input. Audio signals from a microphone may be useful for detecting quick heavy presses that are inputted close to an edge of the touchscreen that is adjacent or proximal to the microphone. In particular, the audio signal data may be used to corroborate a predicted force state of a touch input.

As another example, sensor data may include accelerometer data. Based on the accelerometer data, the processor may be able to discern any patterns that may be helpful for identifying a force state of the touch input. The accelerometer data may indicate, for example, whether there is significant movement of the electronic device such as may be caused by quick, heavy presses on the touchscreen at or near the time of touch input.

Since the change in area, and consequently the change in sum of values in the touch region, is more meaningful in a relational sense than absolute value, some of the capacitive frames from a continuous touch gesture may be used for deciding on the threshold value for determining a force state of a touch input (e.g., whether the touch input is a heavy press or normal touch). In at least some implementations, the capacitive frames at or near the beginning of the touch gesture may be used for deciding on the threshold(s).

The threshold can be defined based on multiple capacitive frames based on the user's interactions during the touch gesture. For example, the threshold may be a function of a plurality of capacitive frames at or near the beginning of the touch gesture. In some implementations, a defined number of capacitive frames at the beginning of a touch gesture (e.g., the first X frames) may be selected, and the threshold value may be computed based on the capacitance value sums associated with the selected capacitive frames.

Over time within a touch gesture, the decision boundaries can be decided based on distribution of values among both normal touches and heavy presses. In some implementations, the capacitance value sums corresponding to each of "normal" and 'heavy" touch input may be assumed to be defined by parametric distributions, such as the normal distribution. The parameters of these distributions (mean and variance, in case of normal distribution) can be determined using methods like Maximum Likelihood Estimation and Maximum a Posteriori estimation. Once determined, the parameters can be used to decide the decision boundary, or threshold, for classifying normal touches versus heavy presses.

Figure 6:
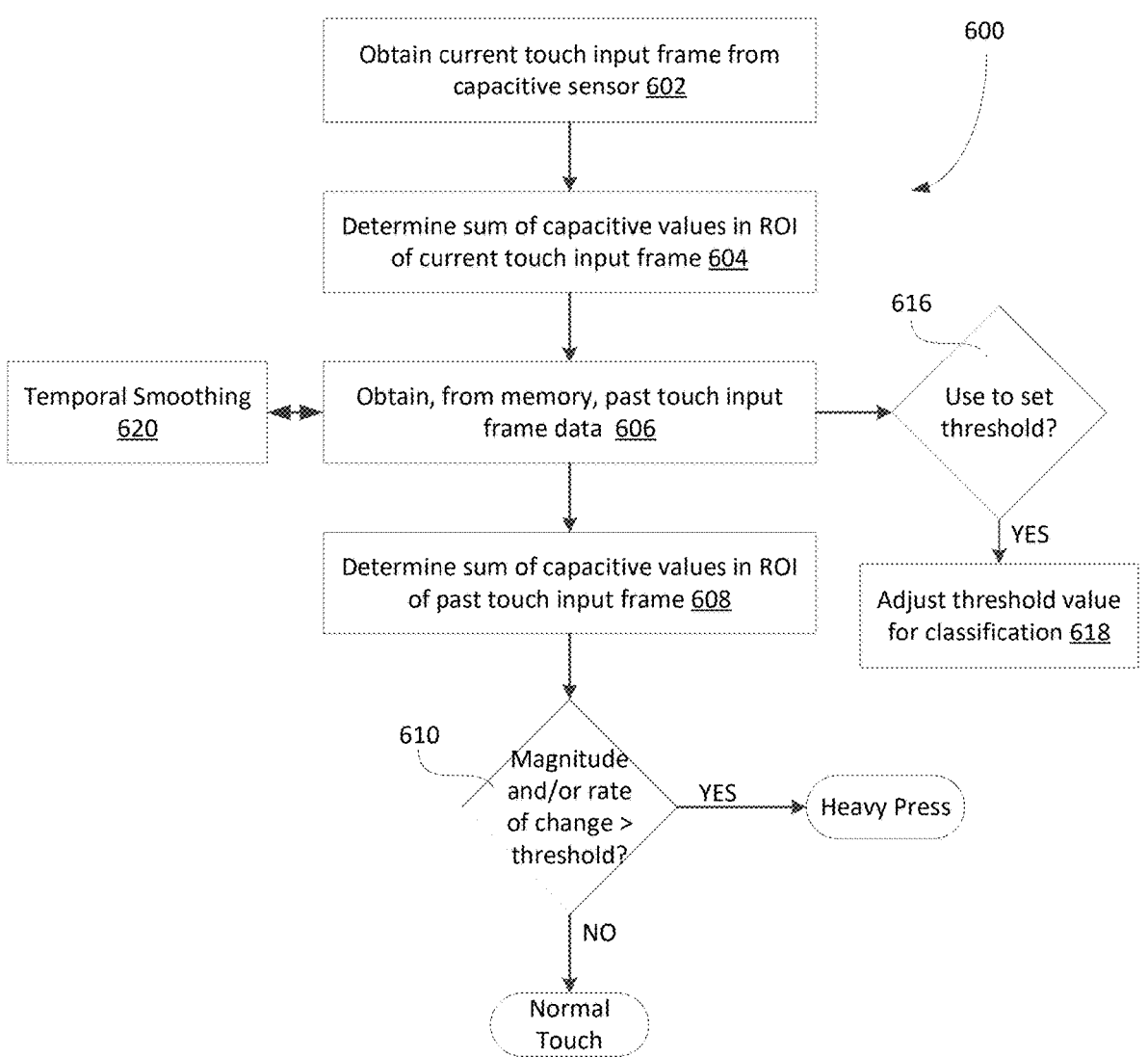
FIG. 6 shows, in flowchart form, another example method for estimating an intended state of touch during a touch gesture on a capacitive interface using sums of capacitance values.

Reference is now made to FIG. 6, which shows another example method 600 for estimating an intended state of touch during a touch gesture on a capacitive interface using sums of capacitance values. The method 600 may be implemented by an electronic device having a capacitive interface. For example, the processor 200 of an electronic device 105 (FIG. 2) that is equipped with a capacitive touchscreen may be configured to perform the operations of method 600. In some implementations, the operations of method 600 may be performed in addition to, or as alternatives of, one or more of the operations of methods 400 and 500.

The force state of a touch may be determined based on the change of sum of capacitance values in the touch region. This can be done based on the change in magnitude of the sum of capacitance values and/or the rate of change of the values. When a continuous touch gesture transitions from normal touch to heavy press, the change in magnitude of the sum of capacitance values is high and positive. When the touch gesture transitions from heavy press to normal touch, the change in intensity values is high and negative.

The rate of change of values (of intensity or sum of intensity in the touch region) may be used to detect the force state of touch at a given point in a touch gesture. When a continuous touch gesture transitions from normal touch to heavy press, the rate of change in intensity values is high and positive. When the touch gesture transitions from heavy press to normal touch, the rate of change in intensity values is high and negative.

The threshold can be defined, for example, based on multiple capacitive frames based on the user's interactions during the touch gesture. For example, the threshold may be a function of one or more capacitive frames at or near the beginning of the touch gesture. Over time within a touch, the decision boundaries can be decided based on distribution of values among both normal touch and heavy presses. For example, the values corresponding to normal touch or heavy press are assumed to be defined by parametric distributions (like normal distributions). These distributions can be multivariate and can be modeled by both the change in magnitude of the sums (of capacitance values) or rate of change in the sums. The parameters of these distributions (mean and variance in case of normal distribution) can be determined using methods like Maximum Likelihood Estimation and Maximum a Posteriori estimation. Once determined, the parameters can be used to decide the decision boundary, or threshold, for normal touch or heavy press.

In operation 602, the processor obtains capacitive frame data associated with a first touch input from a capacitive sensor of the electronic device. The processor then determines a first sum of the capacitance values within the touch region identified in the capacitive frame (operation 604). The processor obtains, from memory, past touch input frame data. More particularly, for each of one or more previous capacitive images associated with touch inputs that are detected prior to the first touch input during the continuous touch gesture, the processor determines a respective sum of measured capacitance values within an identified touch region in the previous capacitive image. The processor compares the sums associated with the one or more previous capacitive images and the first sum. The state of touch of the detected first touch input may be determined based on the comparing. In particular, the processor may determine at least one of a change in magnitude of the sums or a rate of change in the sums.

The force touch classification system of the present disclosure can benefit from user customization that accounts for a particular device user's finger and touch behavior. The variation in size, shape, and elasticity of fingers vary among users. There are also variations in terms of touch behavior among device users.

The present system may provide the ability for users to explicitly calibrate the force touch classification model to adapt it for their preferences, user-specific features such as shape and size of finger(s), and general interaction behavior. The processor of the device may prompt a device user to provide, via a capacitive interface of the device, sample touch data of different types, which may be used for calibration. For example, the device user may be prompted to provide touch samples from one or more of: first touch data associated with at least one first touch input of a first type (e.g., normal touch); second touch data associated with at least one second touch input of a second type (e.g., heavy press); third touch data associated with at least one third touch input that transitions from a touch input of the first type (e.g., normal touch) to a touch input of the second type (e.g., heavy press); or fourth touch data associated with at least one fourth touch input that transitions from a touch input of the second type (e.g., heavy press) to a touch input of the first type (e.g., normal touch).

Over time, the capacitive frame data can be used to update distribution of normal and heavy press classes. User's touch can be recorded as a correct class touch (normal/heavy) if the processor detects that there is no additional measure taken to rectify a triggered action resulting from the touch, and vice versa. Additional information may be extracted based on task being performed or application being used when the touch input is detected. For example, during text editing, the user is expected to perform careful touches, likely consisting of normal or light touches. On the other hand, in the case of gaming on a mobile device, users may be prone to input heavy presses. The processor may use such device usage data to implicitly calibrate the force state classification model for the particular user's finger and touch behavior.

The touch samples and device usage data collected from the user of the device may be used to classify force states of touches in one or more of the following ways: updating threshold values or decision boundary for force classification; few-shot learning-based update approach for neural network used in the classification; nearest neighbor search for new touch inputs against sample touches; and update in the distribution of classes.

The threshold for decisioning on state of touch may be determined based on distribution of relevant values associated with touch inputs collected from a large population of users. In some implementations, multiple thresholds may be selected to cover interaction behavior of a wide range of users. In particular, the threshold may be selected to account for individualized touch behavior. Users may be able to control the "sensitivity" for detecting various force states of touch inputs. More particularly, users may specify "sensitivity levels" in connection with detected touch inputs by, for example, selecting from a predefined set of sensitivity levels. The sensitivity levels allow for controlling various factors relating to force state classification such as, among others, decision thresholds and normalization of input data. For example, a user selection of sensitivity level may be used to tune how "firm" a touch needs to be for it to be identified as a heavy press or a normal touch.

The sensitivity levels may be selected based on a distribution of values associated with touch inputs from general population data. The particular distribution depends on the specific method by which state of touch is determined. For example, in the case of the above-described method using sum of capacitance values, a distribution may be determined for sums of capacitance values. As another example, for the above-described method using rate of change calculations, a distribution may be determined for rates of change. As yet another example, for the above-described method relying on learning-based techniques, a distribution may be determined for the output of a neural network.

The sensitivity levels can be set to correlate with different thresholds as determined using a relevant distribution of values. For example, in the case of rate of change calculations, the sensitivity levels may be set based on different thresholds for rate of change. Similarly, for the methods using capacitance value sums and learning-based techniques, the sensitivity levels may be set based on different thresholds for sum of capacitance values and output of neural network, respectively. In addition to discrete levels of sensitivity, users may be provided with continuous control over sensitivity levels (e.g., thresholds) for the force states. By enabling selection from multiple different levels of sensitivity, users can select their own preferred thresholds for force state decisioning.

Figure 8:
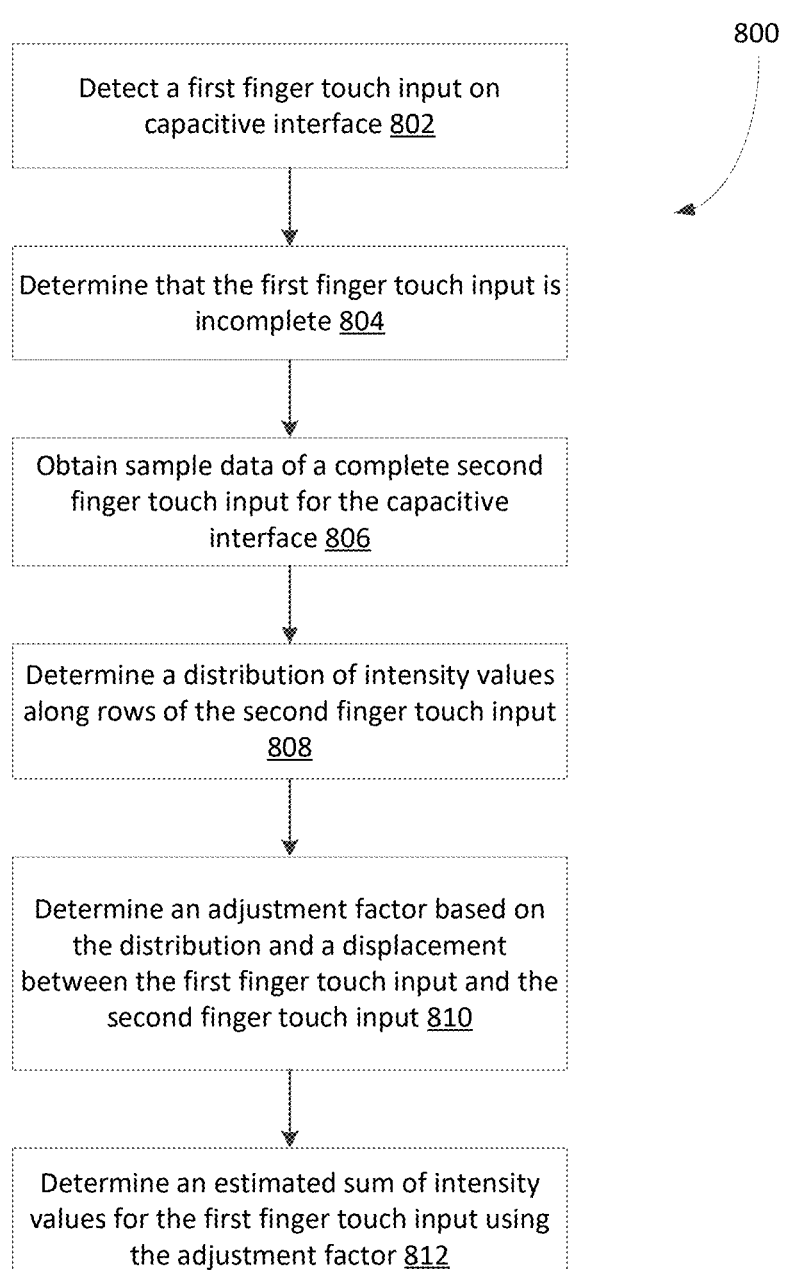
FIG. 8 shows, in flowchart form, an example method for artificially completing a partial touch input on a capacitive interface.

Reference is now made to FIG. 8 which shows, in flowchart form, an example method 800 for artificially completing a partial touch input on a capacitive interface. The method 800 may be implemented by an electronic device having a capacitive interface. For example, the processor 200 of an electronic device 105 (FIG. 2) that is equipped with a capacitive touchscreen may be configured to perform the operations of method 800. In some implementations, the operations of method 800 may be performed in addition to, or as alternatives of, one or more of the methods 400 through 600.

When a user's touch input is located close to or at an edge of a touchscreen, capacitive sensor readings corresponding to parts of the finger may be missing, i.e., not detected. The method 800 enables the missing sensor readings to be artificially completed to make it consistent with the user's regular touch inputs. In particular, the missing information for the sum of intensity values of the incomplete touch input may be determined based on touch data of a known complete touch input.

In operation 802, the processor detects a first finger touch input on a capacitive interface. The processor determines that the first finger touch input is incomplete (operation 804). For example, the processor may determine that at least part of a finger associated with the first finger touch input lands outside the capacitive interface based on capacitive sensor data. In response to determining that the first finger touch input is incomplete, the processor obtains sample data of a complete second finger touch input for the capacitive interface (operation 806).

For the complete second finger touch input, the processor determines a distribution of intensity values along rows of said touch input (operation 808). One potential method for obtaining the distribution along rows may be as follows:

$$\frac{\sum_{row} \text{Intensity values in a row}}{\sum_{Touch_1} \sum_{row} \text{Intensity values in a row}}$$

Specifically, the intensity values for each row of the known complete finger touch input may be summed and expressed as a fractional value. In operation 810, the processor determines an adjustment factor based on the distribution and a displacement between the first finger touch input and the second finger touch input. The adjustment factor may be determined by first computing a vertical/horizontal displacement of the first finger touch input relative to the second finger touch input, and summing over the products of (distributed value of row for the known complete touch×part of the row missing in the incomplete touch input):

$$\text{Adjustment Factor} = \sum (\text{distributed value along row for } Touch_1 *$$
$$\text{part of the row missing in } Touch_2)$$

The processor then determines an estimated sum of intensity values for the first finger touch input using the adjustment factor (operation 812). The estimated touch value may be computed as the sum of intensity values of the first finger touch input divided by the adjustment factor:

$$\text{Estimated touch value} = \frac{\sum_{Touch_2} \text{Intensity values}}{\text{Adjustment Factor}}.$$

The various implementations presented above are merely examples and are in no way meant to limit the scope of this application. Variations of the innovations described herein will be apparent to persons of ordinary skill in the art, such variations being within the intended scope of the present application. In particular, features from one or more of the above-described example implementations may be selected to create alternative example implementations including a sub-combination of features which may not be explicitly described above.

In addition, features from one or more of the above-described example implementations may be selected and combined to create alternative example implementations including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The processor mentioned in embodiments of this application may be a central processing unit (CPU). The processor may further be another general-purpose processor, a digital signal processor (DSP), an application-specific integrated circuit (ASIC), a field programmable gate array (FPGA), or another programmable logic device, a discrete gate, a transistor logic device, a discrete hardware component, or the like. The general-purpose processor may be a microprocessor, or the processor may be any conventional processor or the like.

The memory mentioned in embodiments of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM). For example, the RAM may be used as an external cache. By way of example but not limitation, the RAM may include a plurality of forms such as the following: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA, another programmable logic device, a discrete gate or a transistor logic device, or a discrete hardware component, the memory (storage module) may be integrated into the processor.

It should be further noted that the memory described in this specification is intended to include, but is not limited to, these memories and any other memory of a suitable type.

A person of ordinary skill in the art may be aware that, in combination with the examples described in embodiments disclosed in this specification, units and methods may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the protection scope of this application.

It should be noted that the term "receive" or "receiving" used herein may refer to receiving or otherwise obtaining from an element/component in same apparatus or from another device separate from the apparatus. Similarly, the term "transmit" or "transmitting" may refer to outputting or sending to/for an element/component in same apparatus or to/for another device separate from the apparatus. For example, any of the methods/procedures described herein may be performed by a chipset, in which case any sending or receiving steps may occur between elements of the chipset.

It may be clearly understood by a person skilled in the art that, for the purpose of convenient and brief description, for a detailed working process of the foregoing apparatus and unit, refer to a corresponding process in the foregoing method embodiment. Details are not described herein again.

In the several embodiments provided in this application, the disclosed apparatuses and methods may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic forms, mechanical forms, or other forms.

The units described as separate parts may or may not be physically separate, and parts displayed as units may or may not be physical units, may be located in one position, or may be distributed on a plurality of network units. Some or all of the units may be selected based on an actual requirement to implement the solutions provided in this application.

In addition, function units in embodiments of this application may be integrated into one unit, or each of the units may exist alone physically, or two or more units may be integrated into one unit.

All or some of the foregoing embodiments may be implemented by using software, hardware, firmware, or any combination thereof. When the software is used to implement embodiments, all or a part of embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a special-purpose computer, a computer network, or another programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like. For example, the usable medium may include but is not limited to any medium that can store program code, such as a USB flash drive, a removable hard disk, a ROM, a RAM, a magnetic disk, or an optical disc.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims and the specification.

The invention claimed is:

1. A method for classifying a detected touch input on a capacitive interface, the method comprising:
   obtaining a sequence of capacitive images representing capacitive sensor data associated with touch inputs detected during a continuous touch gesture; and
   sequentially processing the capacitive images using a machine learning model that includes a trained convolutional neural network layer, wherein for each capacitive image in the sequence, processing the capacitive image using the machine learning model comprises:
      determining a sub-image of the capacitive image containing a touch region that corresponds to an area of the capacitive interface associated with a current touch input for the capacitive image;
      performing feature extraction of the sub-image using the trained convolutional neural network layer; and
      determining a state of touch of the capacitive image based on extracted features of the sub-image and one or more previous capacitive images associated with the continuous touch gesture.

2. The method of claim 1, wherein the machine learning model comprises a recurrent neural network layer and wherein determining the state of touch of the capacitive image comprises providing the extracted features and the one or more previous capacitive images as input to the recurrent neural network layer.

3. The method of claim 1, wherein determining the sub-image of the capacitive image comprises determining, based on the capacitive sensor data, a region of the capacitive image that is associated with signal strength indicating the detected touch input, wherein performing the feature extraction on the sub-image comprises providing the sub-image as input to the machine learning model.

4. The method of claim 3, further comprising:
   processing the sub-image using a high-pass filter to obtain a filtered sub-image; and
   determining a normalized sub-image based on the filtered sub-image,
   wherein the normalized sub-image is provided as input to the machine learning model.

5. The method of claim 1, wherein the state of touch indicates an intended amount of applied force associated with the current touch input.

6. The method of claim 1, wherein the continuous touch gesture comprises a force-based press gesture on the capacitive interface.

7. The method of claim 1, wherein the machine learning model uses one or more defined thresholds in determining the state of touch of the capacitive image.

8. The method of claim 7, further comprising:
   obtaining sample touch data including one or more of:
      first touch data associated with at least one first touch input of a first type;
      second touch data associated with at least one second touch input of a second type;
      third touch data associated with at least one third touch input that transitions from a touch input of the first type to a touch input of the second type; or
      fourth touch data associated with at least one fourth touch input that transitions from a touch input of the second type to a touch input of the first type, wherein the one or more defined thresholds are determined based on the obtained sample touch data.

9. The method of claim 7, further comprising:

determining a distribution of outputs of a neural network of the machine learning model based on touch input data collected from multiple users; and determining a plurality of sensitivity levels based on the distribution, each sensitivity level being associated with a respective threshold value of output of the neural network, wherein the one or more defined thresholds correspond to user selections of sensitivity levels.

10. An apparatus comprising:

at least one processor; and a non-transitory computer readable storage medium storing programming, the programming including instructions that, when executed by the at least one processor, cause the apparatus to perform operations for classifying a detected touch input on a capacitive interface, the operations comprising:

obtaining a sequence of capacitive images representing capacitive sensor data associated with touch inputs detected during a continuous touch gesture; and sequentially processing the capacitive images using a machine learning model that includes a trained convolutional neural network layer, wherein for each capacitive image in the sequence, processing the capacitive image using the machine learning model comprises:

determining a sub-image of the capacitive image containing a touch region that corresponds to an area of the capacitive interface associated with a current touch input for the capacitive image;

performing feature extraction of the sub-image using the trained convolutional neural network layer; and determining a state of touch of the capacitive image based on extracted features of the sub-image and one or more previous capacitive images associated with the continuous touch gesture.

11. The apparatus of claim 10, wherein the machine learning model comprises a recurrent neural network layer and wherein determining the state of touch of the capacitive image comprises providing the extracted features and the one or more previous capacitive images as input to the recurrent neural network layer.

12. The apparatus of claim 10, wherein determining the sub-image of the capacitive image comprises determining, based on the capacitive sensor data, a region of the capacitive image that is associated with signal strength indicating the detected touch input, wherein performing the feature extraction on the sub-image comprises providing the sub-image as input to the machine learning model.

13. The apparatus of claim 12, the operations further comprising:

processing the sub-image using a high-pass filter to obtain a filtered sub-image; and determining a normalized sub-image based on the filtered sub-image, wherein the normalized sub-image is provided as input to the machine learning model.

14. The apparatus of claim 10, wherein the state of touch indicates an intended amount of applied force associated with the current touch input.

15. The apparatus of claim 10, wherein the continuous touch gesture comprises a force-based press gesture on the capacitive interface.

16. A non-transitory computer-readable medium having instructions stored thereon that, when executed by an apparatus, cause the apparatus to perform operations for classifying a detected touch input on a capacitive interface, the operations comprising:

obtaining a sequence of capacitive images representing capacitive sensor data associated with touch inputs detected during a continuous touch gesture; and sequentially processing the capacitive images using a machine learning model that includes a trained convolutional neural network layer, wherein for each capacitive image in the sequence, processing the capacitive image using the machine learning model comprises:

determining a sub-image of the capacitive image containing a touch region that corresponds to an area of the capacitive interface associated with a current touch input for the capacitive image;

performing feature extraction of the sub-image using the trained convolutional neural network layer; and determining a state of touch of the capacitive image based on extracted features of the sub-image and one or more previous capacitive images associated with the continuous touch gesture.

17. The non-transitory computer-readable medium of claim 16, wherein the machine learning model comprises a recurrent neural network layer and wherein determining the state of touch of the capacitive image comprises providing the extracted features and the one or more previous capacitive images as input to the recurrent neural network layer.

18. The non-transitory computer-readable medium of claim 16, wherein determining the sub-image of the capacitive image comprises determining, based on the capacitive sensor data, a region of the capacitive image that is associated with signal strength indicating the detected touch input, wherein performing the feature extraction on the sub-image comprises providing the sub-image as input to the machine learning model.

19. The non-transitory computer-readable medium of claim 18, the operations further comprising:

processing the sub-image using a high-pass filter to obtain a filtered sub-image; and determining a normalized sub-image based on the filtered sub-image, wherein the normalized sub-image is provided as input to the machine learning model.

20. The non-transitory computer-readable medium of claim 16, wherein the state of touch indicates an intended amount of applied force associated with the current touch input.

21. The non-transitory computer-readable medium of claim 16, wherein the continuous touch gesture comprises a force-based press gesture on the capacitive interface.

* * * * *